(12) United States Patent
Van Rijnsoever

(10) Patent No.: US 7,447,313 B2
(45) Date of Patent: Nov. 4, 2008

(54) POINTERS TO ENCRYPTED DATA IN RTP HEADER

(75) Inventor: Bartholomeus Johannes Van Rijnsoever, Eindhoven (NL)

(73) Assignee: Irdeto Eindhoven B.V., Hoofddorp (NL)

( * ) Notice: Subject to any disclaimer, the term of this patent is extended or adjusted under 35 U.S.C. 154(b) by 513 days.

(21) Appl. No.: 10/023,159

(22) Filed: Dec. 18, 2001

(65) Prior Publication Data

US 2002/0090086 A1 Jul. 11, 2002

(30) Foreign Application Priority Data

Dec. 18, 2000 (EP) .................. 00204639

(51) Int. Cl.
*H04N 7/167* (2006.01)
(52) U.S. Cl. ..................... 380/207; 380/201
(58) Field of Classification Search ................ 713/150, 713/151, 200; 380/201, 202, 207
See application file for complete search history.

(56) References Cited

U.S. PATENT DOCUMENTS 5,784,566 A * 7/1998 Viavant et al. ............. 709/229
5,953,418 A * 9/1999 Bock et al. ................. 380/240
6,357,028 B1 * 3/2002 Zhu ........................... 714/751
6,449,719 B1 * 9/2002 Baker ........................ 713/168
6,614,844 B1 * 9/2003 Proehl .................... 375/240.08
6,707,914 B1 * 3/2004 Bell ............................ 380/46
6,744,763 B1 * 6/2004 Jones et al. ................. 370/394
7,010,032 B1 * 3/2006 Kikuchi et al. .......... 375/240.01

* cited by examiner

*Primary Examiner*—Kambiz Zand
*Assistant Examiner*—Aubrey H Wyszynski
(74) *Attorney, Agent, or Firm*—Schwegman, Lundberg & Woessner, P.A.

(57) ABSTRACT

In a system that transmits frames of data as a stream of packets, packet header information is augmented with localizing data that serves to distinguish frame header information and frame data of each frame within the stream of packets. The localizing data facilitates encryption of the frame data at the packet level without encrypting the frame header information, and subsequent decryption of the encrypted data within the stream of data.

14 Claims, 2 Drawing Sheets

POINTERS TO ENCRYPTED DATA IN RTP HEADER

Figure 1:
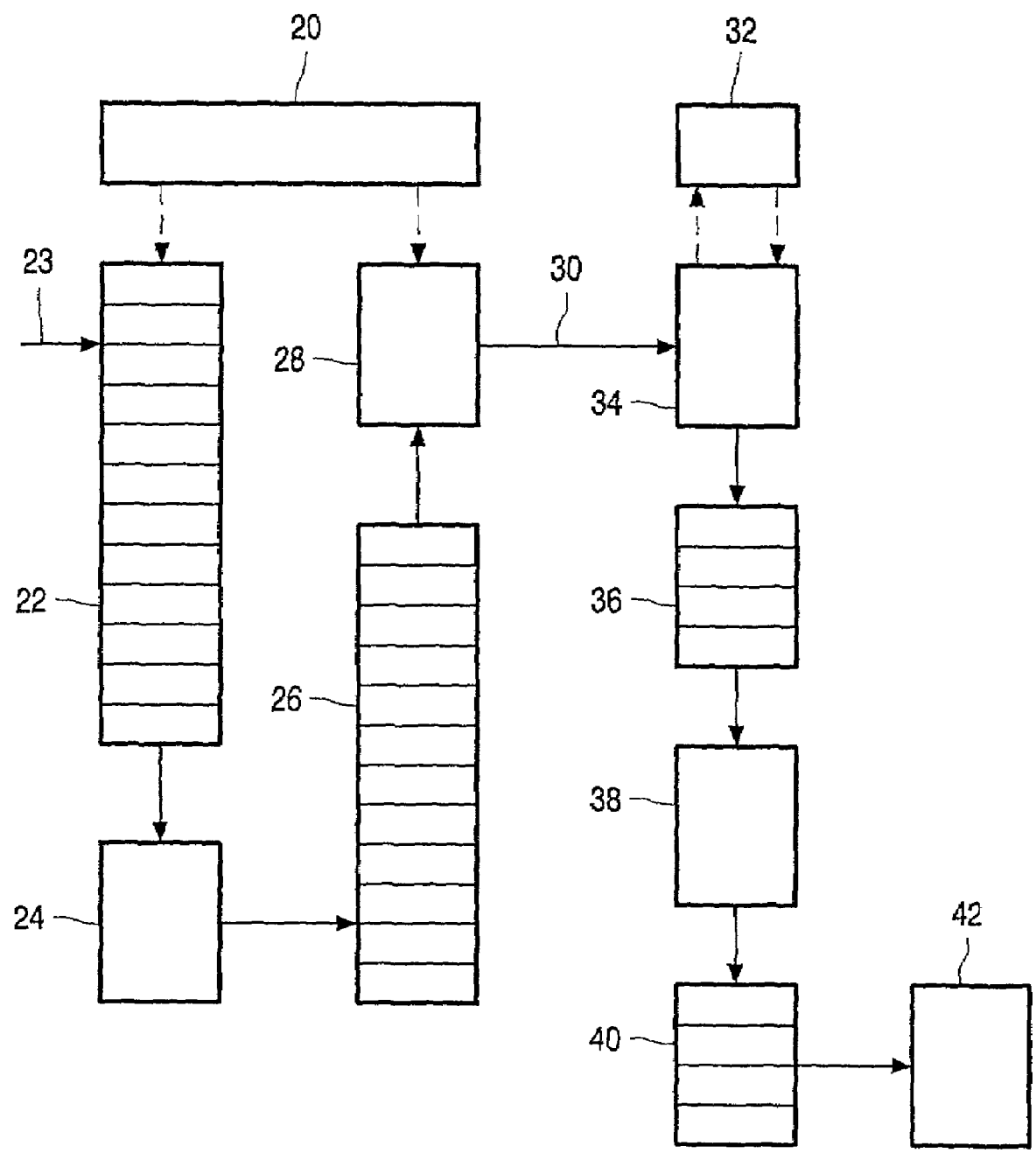

A method and system for real-time transmitting frame-formatted user data through joining thereto frame localizing data placed in predetermined governance locations, whilst before transmission effecting an encryption procedure that excludes said localizing data, and a system, a transmitter apparatus, a receiver apparatus, and a signal produced by such transmitter apparatus for use with such method.

The invention relates to a system as recited in the preamble of claim 1. Data, and in particular, but not restricted to, multi-media data are at present being encrypted for implementing inter alia various conditional access schemes to allow creators and distributors of the original matter to collect an appropriate amount of retributions from users of such information. At the receiver side, the user data must be recuperated in order to allow for orderly representing, viewing, listening, executing, and other user-associated operations. The actual transmission via some transmission medium, such as a network, will take place on a packetized level, where the packets are standardized for the network or networks in question.

A first approach is to effect the encryption on the basis of a Real Time Protocol transmission packet, which is a relatively simple procedure and is alright for protecting the transmission proper. Alternatively, a higher protection level can be attained that will also remain in force at the receiver side: this can be done by having the encryption implemented on the basis of the frame structure of the source data or user data. It is also feasible to implement a combination of the two above approaches. Now, the encryption should advantageously be executed in a standard component that should not need to effect complicated preprocessing to find the start of a frame. Therefore, all of the above procedures will need an easy mechanism to straightforwardly find the beginning of the frames.

In consequence, amongst other things, it is an object of the present invention to add specific localizing information to allow the encoder mechanism and possibly, also the decoder mechanism to quickly and easily find the start of the various frames.

Now therefore, according to one of its aspects the invention is characterized according to the characterizing part of Claim 1.

Further to the above, the present inventor has recognized that a slight modification to the above may allow to have only a part of the user data being effectively encrypted, whilst still enabling the immediate localizing of the various such encrypted parts, as has been recited in Claim 2. The invention also relates to a system being arranged for implementing the method as claimed in Claim 1, to a transmitter apparatus and to a receiver apparatus for use in such system, and to a signal produced by such transmitter apparatus. Further advantageous aspects of the invention are recited in dependent Claims.

Figure 2:
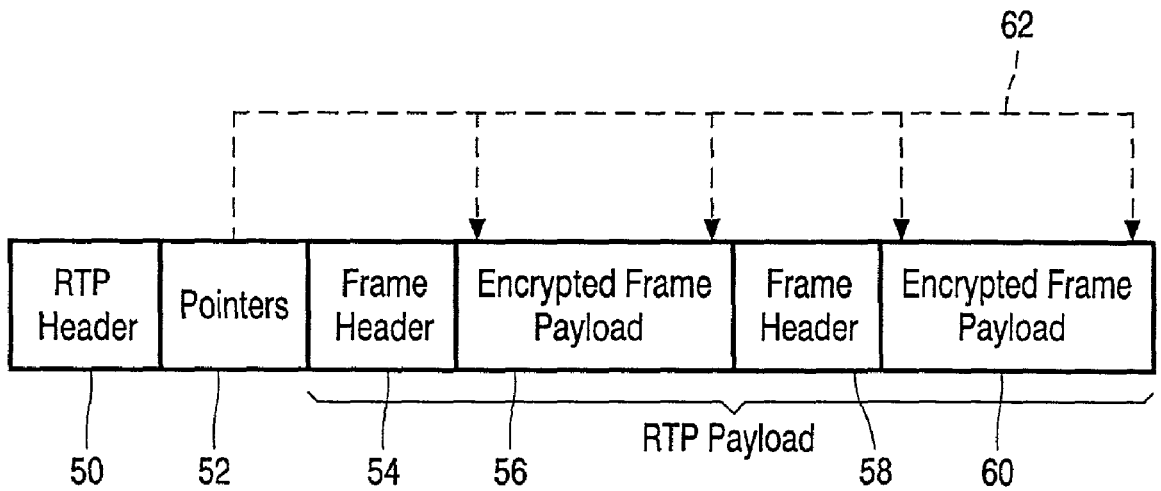
Figure 3:
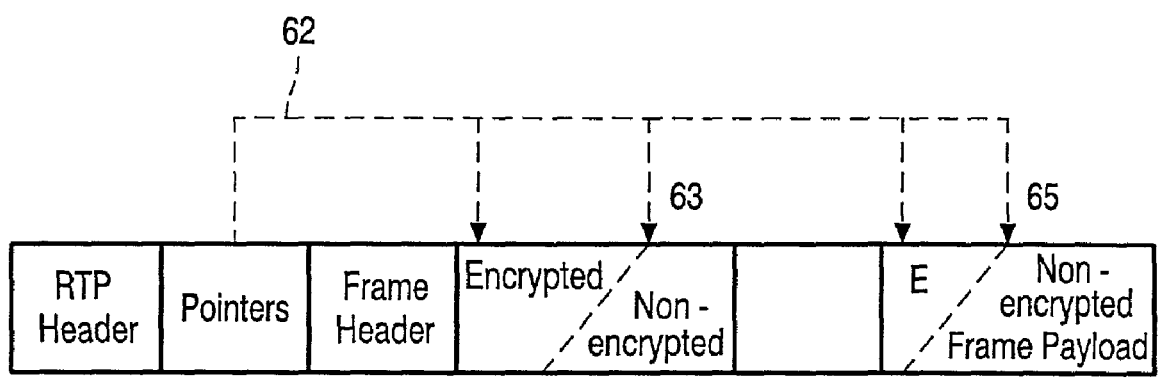

These and further aspects and advantages of the invention will be discussed more in detail hereinafter with reference to the disclosure of preferred embodiments, and in particular with reference to the appended Figures that show:

FIG. 1, a system arranged for implementing the inventive method;

FIG. 2, a data format implementation for use in the present invention;

FIG. 3, an amended format with respect to FIG. 2 that has partial encrypting.

The quality of content information, such as audio or video on the Internet is improving due to steady advances in coding technology and in transmission bandwidth. Content providers intend to sell such high value content, and therefore, a need is arising for effecting conditional access or digital rights management, as it is called. Such conditional access system will encrypt a content item and will subsequently manage the associated decryption keys in such manner that only authorized end users will be able to decrypt and thereby reconstitute the original content in full.

Now, multi-media data is generally structured in frames, wherein the size of a frame is related to the category of information. Furthermore, the size of a transmitted frame may relate to the degree of compaction and other processing it has been subjected to before encryption. In fact, the frames may be larger as well as smaller than the packets used for actual transmission. Therefore, a single transmission packet may contain one or more frames, or fractional parts of a frame. Streaming is a technology wherein a client will play or otherwise use the content as soon as it will arrive, so there will be no downloading of all, or a substantial part of, an entire content before playing. Streaming will not allow for retransmission of packets. The content user will have to cope with the occurrence of lost data.

Now for optimum protection, content is best encrypted at the frame level, even with non-uniform frame size. Such encryption at the frame level will allow for persistent or end-to-end encryption that applies to both transmitted as well as to stored content. Preferably, the system component that implements the actual encryption is a generic component, and should therefore be independent of specific streaming servers and independent of specific frame formats. One way to achieve this is to define the encryption component as a Real-time-Transmission-Protocol- or RTP-translator. At present, virtually all streaming servers are using the RTP streaming protocol. Therefore, the encryption component could receive the RTP packets, encrypt the payload, and subsequently forward the encrypted RTP packets. Alternatively, the encryption may be integrated with the streaming server.

Alternatively, the encryption may be executed on the level of the RTP-packet. This will protect the transmission proper, whilst surrendering part of the protection at the receiver side after receiving. Also, a combination of these two encryption approaches is feasible, such as by assigning the appropriate encryption level on the basis of a contingency strategy that is based on available hardware facilities.

A problem is posed in that the headers of the frames must remain unencrypted, such as when the encryption is effected at the frame level. This requires that the generic encryption component should analyze the payloads of the RTP packets to identify the positions of the frame headers. Such would however lower the performance of the encryption component, and will also make the encryption component dependent on actual frame formats.

The present invention provides a solution to the problem in question by extending the headers of RTP packets to include pointers to those parts of the RTP packet payload that actually need to be encrypted. The pointers are set by the streaming server. The server may do this as part of the so-called hint process, that is an off-line analysis of multi-media data, so that the data may be streamed more efficiently at a later instant in time. The result of the hint process is stored in parallel to the content in a so-called hint track.

FIG. 1 illustrates a system arranged for implementing the inventive method. Input 23 receives the user data frames, that are transiently stored into storage 22, which accommodates storage of a plurality of such frames. Processing block 24 thereupon joins to these data frames frame header localizing informations in the context of an RTP packet that may comprise a plurality of such user frames, but not necessarily an integer number thereof. The result of this processing is transiently stored in block 26 that accommodates multiple RTP payloads. For brevity, the specific hint track mentioned supra has not been shown separately. In fact, the hint track facility will be recognized by persons skilled in the art as a standard facility. In practice, such hint track will be implemented at the input side of block 23 to allow indicating the various frame locations. Before transmission, the user data are encrypted in encryption module 28 and transmitted over communication facility 30, such as Internet. The whole procedure at the transmitter side of the system shown may be synchronized by overall synchronization facility 20 as indicated by dashed lines leading therefrom.

At the receiving side, decryption is effected through decryption facility 34, and the result thereof is transiently stored in block 36. Reconstitution of the user frames is effected in processing facility 38, followed by transiently storing in block 40. User application is then symbolized by block 42. Storage blocks 36, 40 do not accommodate downloading of a complete program or a substantial part thereof, but rather will provide for some synchronizing to cater for transfer speed variations of communication facility 30. Again, at the receiver side, overall synchronization is effected through synchronizer block 32.

FIG. 2 illustrates an exemplary data format implementation for use in the present invention. For brevity, only a single implementation has been shown. Various data blocks 50-60 of the RTP configuration have been shown in the Figure. Of these, blocks 54-60 constitute the RTP payload, wherein blocks 56, 60 each contain an encrypted frame payload, and blocks 54, 58 contain the associated frame headers. Note that the lengths of blocks 56, 60 need not be uniform. Block 50 contains an RTP header, and is followed by block 52 that contains pointers. As shown in the figure, the pointers 62 indicate both the beginning and the end of each encrypted frame payload. Now, the header 50 is found in the hint track; pointers 52 are extensions of the RTP header 50. This hint track is used by the streaming server for packaging the RTP packets.

FIG. 3 illustrates an amended format with respect to FIG. 2 that has partial encryption of the user data. For brevity, only the aspects that differentiate from FIG. 2 have been indicated specifically. Within the frame payload, the discrimination between encrypted (E) and unencrypted user data has been indicated by a slanted line. The localizing information indicated by 62 in this case will now specially indicate (63, 65) the ends of the respective encrypted parts, assuming that the encryption starts from the beginning of the frame's user data. Of course, other partial encryptions may be used. The encryption itself may be done on the level of a frame or partial frame, on the level of a packet, or be based on a combination thereof.

The invention claimed is:

1. A method comprising:
processing a plurality of frames to provide a stream of Real Time Protocol (RTP) packets that includes the plurality of frames and a set of localizing data that facilitates distinguishing locations of frame header information and frame data of each frame within the stream of RTP packets, wherein the set of localizing data further facilitates distinguishing encrypted and non-encrypted content of the stream of RTP packets, and
including one or more of the set of localizing data in one or more RTP packets of the stream of RTP packets, wherein the one or more of the localizing data is included in an RTP header of the one or more RTP packets.

2. The method of claim 1, including
distinguishing the location of frame data in each frame, based on the localizing data,
encrypting the frame data of each frame to provide encrypted frame data, and
providing the encrypted frame data as the frame data of each frame within the stream, and
providing a second stream of data that includes the frame header information and the encrypted frame data of each frame and localizing data that facilitates distinguishing locations of the frame header information and the encrypted frame data within the stream.

3. The method of claim 1, wherein
each RTP packet of the stream of RTP packets includes at least one of: a partial frame, and one or more full frames.

4. The method of claim 1, wherein
the one or more of the localizing data is included in hint tracks of the stream of RTP packets.

5. The method of claim 1, including
transmitting the stream of RTP packets to a remote system.

6. A system comprising:
a storage that is configured to receive a plurality of frames,
a processor that is configured to process the plurality of frames to:
create a stream of Real Time Protocol (RTP) packets that includes the plurality of frames and a set of localizing data that facilitates distinguishing locations of frame header information and frame data of each frame within the stream, wherein the set of localizing data further facilitates distinguishing encrypted and non-encrypted content of the stream of RTP packets, and
include one or more of the set of localizing data in one or more RTP packets of the stream of RTP packets, wherein the one or more of the set of localizing data is included in an RTP header of the one or more RTP packets.

7. The system of claim 6, including
an encryption module that is configured to:
distinguishing the location of frame data in each frame, based on the localizing data,
encrypt the frame data of each frame to provide encrypted frame data, and
provide a second stream of RTP packets that includes the frame header information and the encrypted frame data of each frame and localizing data that facilitates distinguishing locations of the frame header information and the encrypted frame data within the stream.

8. The system of claim 7, wherein the encryption module is configured to transmit the second stream of RTP packets to a remote system.

9. The system of claim 6, wherein
the one or more of the localizing data is included in header information of the one or more RTP packets.

10. The system of claim 6, wherein
the one or more of the localizing data is included in hint tracks of the stream of RTP packets.

11. The system of claim 6, including
a transmitting module that is configured to transmit the stream of RTP packets to a remote system.

12. A system including
a storage that is configured to receive a stream of Real Time Protocol (RTP) packets, and
a processor that is configured to process the stream of RTP packets to distinguish frame header information and frame data of a plurality of frames within the stream of RTP packets, based on localizing data that is included within an RTP header of the stream of RTP packets, wherein the localizing data further facilitates distinguishing encrypted and non-encrypted content of the stream of RTP packets.

13. The system of claim 12, including a decryptor that is configured to:

extract the frame data from the stream of RTP packets, based on the localizing data, and decrypt the frame data to provide decrypted frame data.

14. The system of claim 13, including a processor that is configured to process the frame header information and decrypted frame data to provide content information to a user application.

* * * * *